Oct. 1, 1935.   F. H. BEST   2,015,779
TRANSMISSION MEASURING SYSTEM
Filed Aug. 12, 1933   2 Sheets—Sheet 1
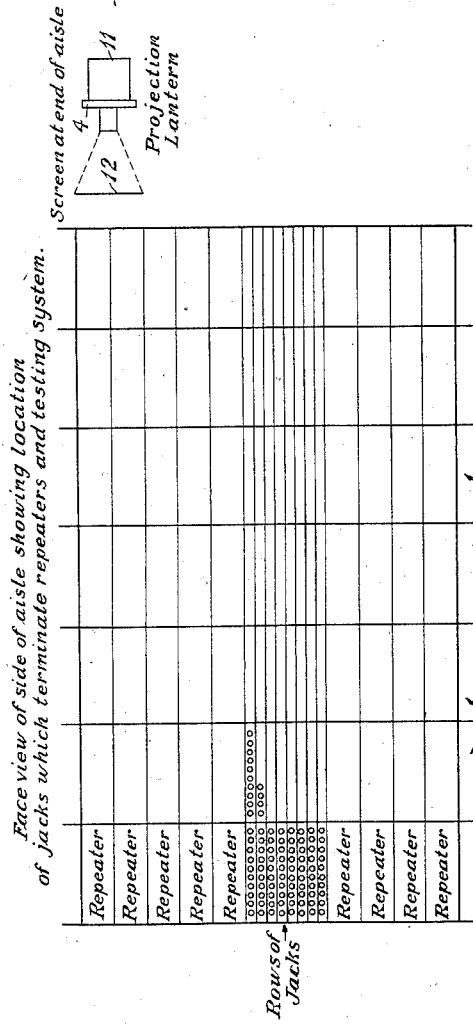
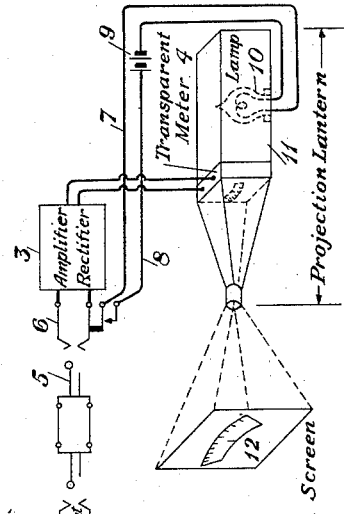
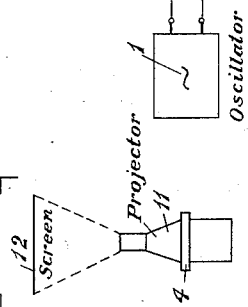
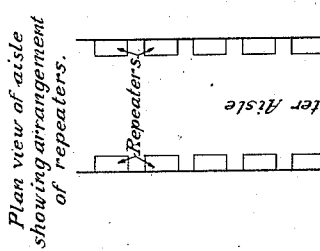
INVENTOR
F. H. Best
BY
ATTORNEY

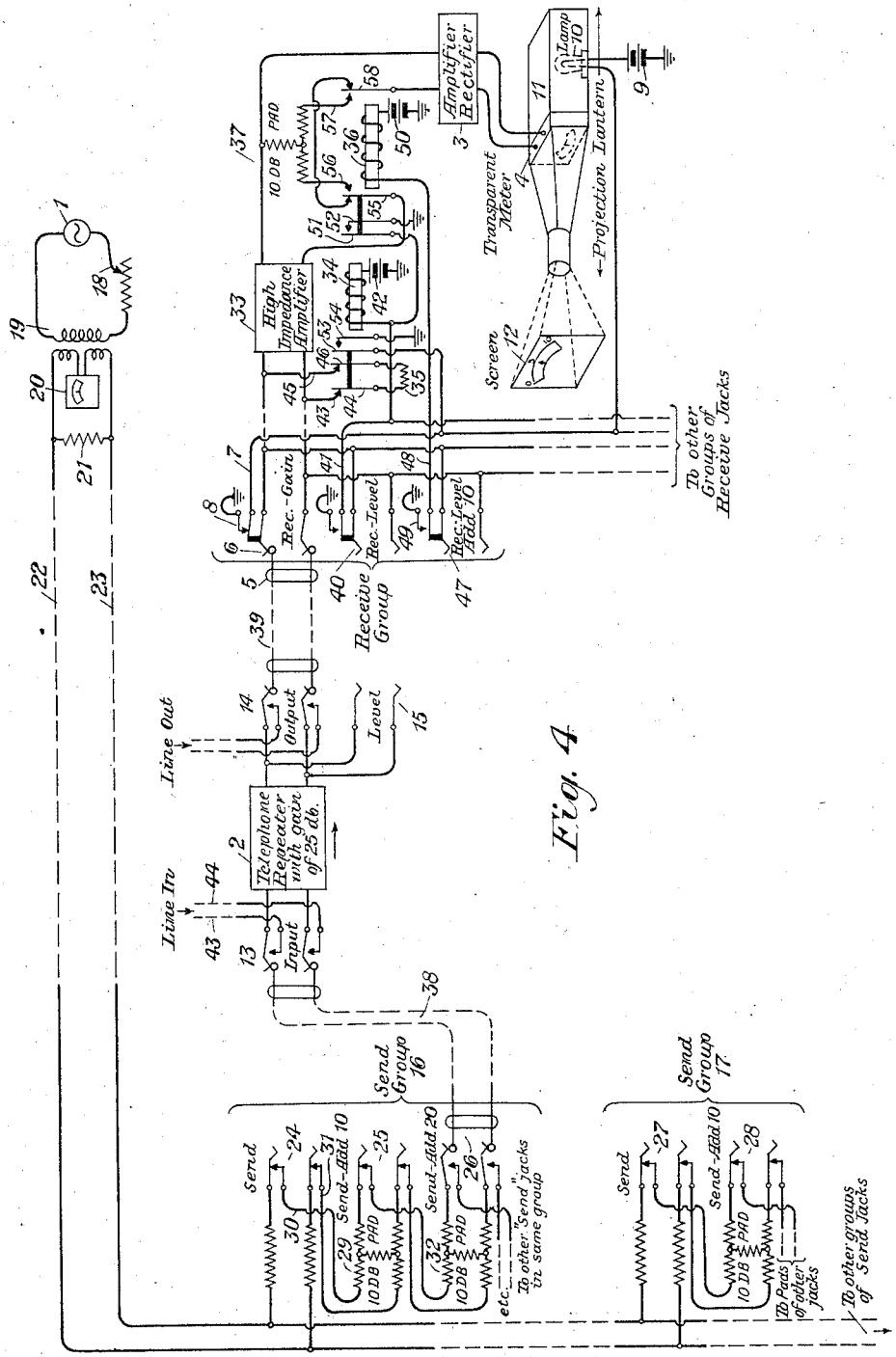

Patented Oct. 1, 1935

2,015,779

UNITED STATES PATENT OFFICE 2,015,779

TRANSMISSION MEASURING SYSTEM

Fred Heller Best, Westfield, N. J., assignor to American Telephone and Telegraph Company, a corporation of New York Application August 12, 1933, Serial No. 684,913

2 Claims. (Cl. 179—175.31)

This invention relates to improvements in devices for measuring or testing electric currents.

The invention is particularly adapted for making measurements to obtain the transmission equivalent of telephone circuits or the transmission gain of a telephone repeater, especially in large repeater stations where frequent measurements are required, although it may be utilized for other purposes. One of the principal features of the invention is that the testing terminals appear at each point in the office where tests are made, the results being indicated directly by a meter, the scale of which is projected on a screen so that it is visible from each testing point. It thus does away with manually operated, centrally located measuring devices of former systems which require more connections before a measurement can be made and which may require several trips between the testing apparatus and a repeater in the course of the test.

This invention will be understood from the following description when read in connection with the attached drawings, of which Figures 1 and 2 show the arrangement of the repeaters in a large repeater station, Fig. 3 shows a schematic circuit of the arrangement of the invention, and Fig. 4 shows, in detail, circuit arrangements of the invention as used in practice.

In Fig. 3 oscillator 1 supplies testing current of, say, 1000-cycle frequency to the input of a telephone repeater. The output current is amplified and rectified by amplifier-rectifier 3, the resulting direct current causing a displacement of the pointer of meter 4, the displacement being a measure of the transmission gain of the repeater. The meter is transparent and is mounted in a projection lantern 11 so that the scale of the meter and the position of the pointer are projected in greatly enlarged form on screen 12, from which it can be read at considerable distances. Insertion of plug 5 into jack 6 connects conductors 7 and 8 together through the jack contacts, completing the circuit of the battery 9 through lamp 10 causing it to light. This feature provides a busy test since the appearance of the scale on the screen is an indication that the device is in use.

A large telephone repeater station usually contains several hundred repeaters which are mounted on vertical racks, as shown in Fig. 2, and arranged in parallel rows forming aisles, as shown in Fig. 1, the repeaters being positioned so that all of the repeaters on one side of an aisle face those on the opposite side. Each aisle may contain from 200 to 400 or more repeaters. For maintenance purposes the terminals of each repeater are brought to jacks, the jacks for each vertical row being mounted in a group as shown in Fig. 2. The terminals of the testing apparatus used in this invention also appear in these same jack groups and, as shown in Figs. 1 and 2, the screen is mounted at one end of the aisle so that it is visible from any jack group. In the system heretofore used, in which the testing apparatus was mounted at some point in the aisle, the making of a measurement required several trips between the repeater and the testing apparatus; but in the system embodying my invention testing may be carried on directly in front of any repeater and the results of a repeater adjustment observed without moving from the repeater.

In Fig. 4, repeater 2 represents any one of those in an aisle and jacks 13, 14 and 15 represent respectively the input, output and level terminals commonly provided for a repeater. The jacks 13 and 14 are so designed that when a plug is inserted in those jacks, the line is cut off as shown. Jack 15, however, is arranged not to cut off the line, thereby providing a bridging connection on the output terminals of said repeater so that a measurement of the transmission condition of a circuit at that point may be obtained without opening the circuit. The group of jacks designated Send group 16 supplies testing power for a vertical row of repeaters and for closely adjacent rows which can be conveniently reached, several groups of jacks being provided for each side of each aisle. Oscillator 1 supplies constant testing power to conductors 22 and 23 through a circuit that includes a variable resistance 18, transformer 19, milliammeter 20 and resistance 21, the said circuit serving to adjust the applied power to the proper value and hold it at that point. Each group of send jacks, of which there may be a large number for one oscillator, receives the same power from conductors 22 and 23, all being in multiple.

In testing a repeater it is important that the output power be below the overload point of the repeater. Since the gains of repeaters in a large group vary over a considerable range, it is necessary to provide different input testing powers to prevent repeater overloading. This is accomplished in the following manner. Each send group is made up of several jacks and resistance networks, these being in series so that by plugging in different jacks, different amounts of power may be obtained. For example, a connection to jack 24 gives the maximum amount of power. Jack 25 provides 10 db. less power, resistance network 29 which causes 10 db. loss being connected between jacks 24 and 25 by conductors 30 and 31. Similarly, jack 26 provides 20 db. less power than 24, an added 10 db. loss being caused by network 22. Additional series jacks and networks may be provided as desired. Send group 17 is similar to group 16, jacks 27 and 28 supplying, respectively, the same power as 24 and 25.

The receiving part of the measuring device which contains the projection meter is terminated on jacks, groups of which are multipled among the vertical rows of repeaters. The receiving part consists principally of a high impedance amplifier 33 which may be made low impedance by connecting resistance 35 across the input terminals through the contacts of relay 34; the receiving apparatus also includes the transparent meter 4, projector 11, and screen 12. Relay 36 when operated connects a 10 db. network 37 between the amplifier 33 and the amplifier-rectifier 3. The range of the meter illustrated is 10 db. Since the testing power supplied by the sending jacks can be varied in 10 db. steps the testing range is continuous from minimum to maximum.

Fig. 4 shows repeater 2 adjusted to give a gain of 25 db. Since the output power of the repeater must produce a reading between 0 and 10 db. on meter 4, a power of 20 db. less than the standard power supplied by jack 24 must be used. Jack 26 supplies this power through the cord as shown. The output of the repeater is connected through cord 39 to jack 6. Inserting plug 5 into jack 6 connects conductors 7 and 8 together through the jack contacts, completing the circuit to ground of battery 9, lamp 10 and conductor 7. This causes the scale of meter 4 to appear on screen 12. The power output of the repeater is amplified by amplifier 33, further amplified and rectified by amplifier-rectifier 3, and causes a displacement of the pointer of meter 4, which indicates a reading of 5 db. on screen 12 or a power of 5 db. above the standard. Jack 26 supplies a power 20 db. below the standard. The sum of these is 25 db. which is the gain of the repeater. Jack 26 is, therefore, designated Add 20, which indicates the amount to be added to the meter reading to obtain the repeater gain.

When measuring the transmission level at the output of a repeater in a circuit, the cord shown connecting jacks 14 and 6 is removed and jacks 15 and 40 are connected. This operation grounds conductor 41 through the jack contacts completing the circuit of battery 42, relay 34 and conductor 41 through ground, causing relay 34 to operate. This opens the contact between 43 and 44 and between 45 and 46, removing resistance 35 so that the high impedance amplier 33 is connected directly to the output of repeater 2. The relay also closes contacts 53 and 54, grounding conductor 7 and causing lamp 10 to light. When making a level measurement, testing power is usually supplied from one end of the telephone line and consequently no plug is inserted in jack 13, the power coming in over conductors 43 and 44.

If the voltage at jack 15 is such as to cause the pointer of meter 4 to swing off scale at the upper end, the plug is removed from jack 40 and inserted in jack 47. Inserting the plug in jack 47 grounds conductor 48 through contact 49, completing the circuit from grounded battery 50, relay 36 and conductor 48, causing relay 36 to operate, inserting a 10 db. loss-network 37 between amplifiers 33 and 3 by connecting contact 55 with 56 and 57 with 58, thereby decreasing the deflection 10 db. Since the meter is calibrated from 0 to 10, the insertion of the 10 db. network raises the actual level range to 10 to 20 so that, in computing the actual level, 10 db. must be added to the meter reading. For that reason, jack 47 is designated Add 10. The operation of relay 36 operates relay 34 by connecting it to ground through contacts 51 and 52 so that resistance 35 is removed from amplifier 33 and lamp 10 is lighted.

While the invention has been disclosed in certain specific arrangements which are deemed desirable, it is understood that it is capable of embodiment in many and other widely varied forms without departing from the spirit of the invention as defined in the appended claims.

What is claimed is:

1. In a system for testing the transmission efficiency of each of a plurality of repeaters at a test station, the combination with a plurality of repeaters arranged in groups upon racks in the said station, of a plurality of jacks upon each rack, a source of testing power connected to one group of said jacks at each rack, switching means to connect one of said jacks of the said group upon the one rack to the input of a repeater upon the same rack which repeater is to be tested, a measuring circuit common to all of said racks and terminating upon another group of said jacks at each of said racks, the measuring circuit having a measuring instrument so positioned with respect to all of said racks that its indications are visible from each repeater rack, and switching means to connect the output of the repeater under test to the jack of the said measuring circuit upon the same rack upon which is located the repeater under test.

2. In a system for testing the transmission efficiency of each of a plurality of repeaters at a test station, the combination with a plurality of repeaters arranged in groups upon racks in the said station, of a plurality of jacks upon each rack, a source of testing power connected to one group of said jacks at each rack, the said jacks having associated therewith networks whereby power of different magnitudes is available for testing, switching means to connect one of said jacks of one rack to the input of a repeater upon the said rack which repeater is to be tested, a measuring circuit terminating upon a plurality of jacks at each rack, one of said jacks being employed when transmission gain is to be measured and others employed in the measurement of transmission levels, the said circuit having a measuring instrument so positioned with respect to all of said racks that its indications are visible from each repeater rack, and switching means to connect the output of the repeater under test to any jack of the said measuring circuit upon the rack upon which is located the repeater under test.

FRED HELLER BEST.